(12) United States Patent
Blincow

(10) Patent No.: US 12,145,752 B2
(45) Date of Patent: Nov. 19, 2024

(54) RAPID SEQUENTIAL CIRCULAR ASSEMBLY SYSTEM FOR SPACE STATION

(71) Applicant: John Jeffrey Blincow, Alta Loma, CA (US)

(72) Inventor: John Jeffrey Blincow, Alta Loma, CA (US)

(73) Assignee: John Blincow, Alta Loma, CA (US)

( * ) Notice: Subject to any disclaimer, the term of this patent is extended or adjusted under 35 U.S.C. 154(b) by 42 days.

(21) Appl. No.: 18/077,221

(22) Filed: Dec. 7, 2022

(65) Prior Publication Data

US 2023/0174252 A1 Jun. 8, 2023

Related U.S. Application Data

(60) Provisional application No. 63/286,670, filed on Dec. 7, 2021.

(51) Int. Cl.
| | |
|---|---|
| *B64G 99/00* | (2009.01) |
| *B23K 9/00* | (2006.01) |
| *B23K 9/095* | (2006.01) |
| *B23K 9/10* | (2006.01) |
| *B23Q 17/24* | (2006.01) |
| *B64G 1/12* | (2006.01) |

(52) U.S. Cl.
CPC .............. *B64G 99/00* (2022.08); *B64G 1/12* (2013.01); *B23K 9/0052* (2013.01); *B23K 9/0953* (2013.01); *B23K 9/1006* (2013.01); *B23Q 17/2409* (2013.01)

(58) Field of Classification Search
CPC ..... B64G 99/00; B23P 21/00; B23K 2101/12; B65D 88/06
USPC ......................................................... 244/159.4
See application file for complete search history.

(56) References Cited

U.S. PATENT DOCUMENTS

| | | | | | |
|---|---|---|---|---|---|
| 4,057,207 A | * | 11/1977 | Hogan | ...................... | B64G 1/64 244/159.4 |
| 4,122,991 A | * | 10/1978 | Johnston | ................... | B64G 4/00 228/173.6 |
| 5,156,361 A | * | 10/1992 | Lang | ....................... | B64G 1/641 244/159.4 |

(Continued)

FOREIGN PATENT DOCUMENTS

CN 111185697 A * 5/2020 ............... B21D 5/14

OTHER PUBLICATIONS

CN111185697A translation (Year: 2020).*

*Primary Examiner* — Michael W Hotchkiss

(57) ABSTRACT

A rapid sequential circular assembly system for a space station includes a plurality of station-constructing modules arranged in a circular manner that are connected to each other in radial profile so that a torus-shaped space station and/or cylindrical shaped space station can be built with a plurality of panels. Each station-constructing module includes a panel dispensing unit, a panel transporting cart, a first welding assembly, and a second welding assembly. The panel transporting cart is operatively coupled to a pair of rails of the panel dispensing unit, wherein the panel transporting cart travels between a storage compartment of the panel dispensing unit and the second welding assembly. The first welding assembly is connected along the pair of rails, and the second welding assembly is terminally connected across the pair of rails to seam weld each of the panels that are transported from the panel transporting cart.

12 Claims, 12 Drawing Sheets

(56) References Cited

U.S. PATENT DOCUMENTS

| | | | | |
|---|---|---|---|---|
| 5,580,013 | A * | 12/1996 | Velke | B64G 1/222 |
| | | | | 244/159.5 |
| 7,686,255 | B2 * | 3/2010 | Harris | B64G 1/401 |
| | | | | 244/172.6 |
| 9,133,640 | B2 * | 9/2015 | Cantoni | F16M 13/00 |
| 9,444,004 | B1 * | 9/2016 | Spence | H01L 31/18 |
| 11,230,853 | B2 * | 1/2022 | Speciale | E04H 7/04 |
| 11,358,738 | B1 * | 6/2022 | Eller | B64G 1/10 |
| 2011/0180669 | A1 * | 7/2011 | Johnson | B64G 1/12 |
| | | | | 244/158.3 |
| 2011/0210110 | A1 * | 9/2011 | Dearman | B23K 37/0282 |
| | | | | 219/136 |
| 2014/0319283 | A1 * | 10/2014 | Holemans | B64G 1/641 |
| | | | | 244/173.3 |
| 2016/0185472 | A1 * | 6/2016 | Blincow | B23P 21/004 |
| | | | | 29/650 |
| 2017/0036783 | A1 * | 2/2017 | Snyder | B23K 9/044 |
| 2020/0002027 | A1 * | 1/2020 | Borrego Borrego | B64G 1/10 |
| 2022/0144460 | A1 * | 5/2022 | Uzo-Okoro | B64G 4/00 |

\* cited by examiner

RAPID SEQUENTIAL CIRCULAR ASSEMBLY SYSTEM FOR SPACE STATION

The current application claims a priority to the U.S. provisional patent application Ser. No. 63/286,670 filed on Dec. 7, 2021.

FIELD OF THE INVENTION

The present invention relates generally to a method for building a torus-shaped space station, a spacecraft body, or any long, or large cylinder needed in space for habitation. More specifically, the system of the present invention provides multiple machines such as storage compartment, carts, and weld machines that align and weld panels to build a torus-shaped space station, spacecraft, or cylindrical station or spacecraft.

BACKGROUND OF THE INVENTION

A space station is a spacecraft capable of supporting a human crew in orbit for an extended period of time. Because the assembled space station is hard to launch into space from the earth, most space stations are built in orbit. Space Station was taken into space piece-by-piece and gradually built. While there can be various shapes and types of space stations, building the space station takes a great amount of time and money. Therefore, there is a need of discovering less time-consuming and cost-effective methods of building the space station.

An objective of the present invention is to provide a system and method for building a torus-shaped space station rapidly. Utilizing the present invention, the pieces of the space station are assembled using multiple components such as a plurality of magazines, a plurality of magazine carts, and a plurality of weld machines. The assembled space station will fulfill the habitational or any desired purposes. The assembly process can be completed quickly therefore, the present invention saves a great amount of time and cost. Additional features and benefits are further discussed in the sections below.

DETAILED DESCRIPTION OF THE INVENTION

Figure 1:
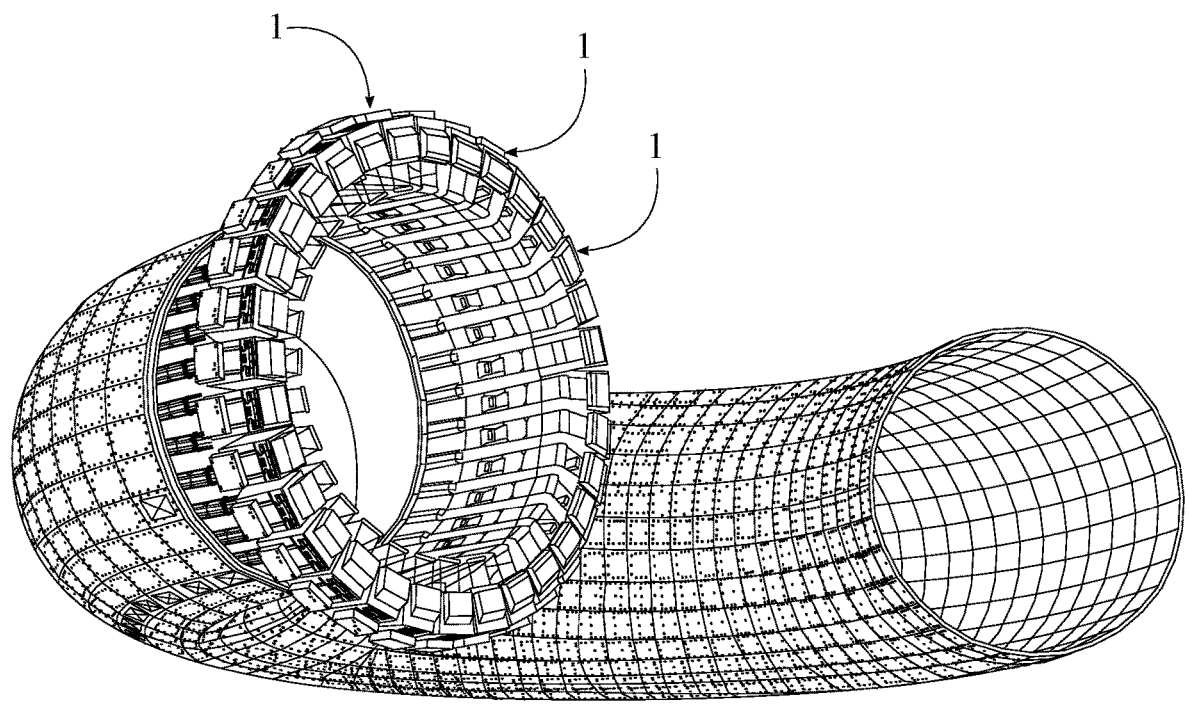
FIG. 1 is an illustration showing the torus-shaped space station assembly process of the present invention.

All illustrations of the drawings are for the purpose of describing selected versions of the present invention and are not intended to limit the scope of the present invention.

The present invention provides a system and method for building a torus-shaped space station and/or cylindrical shaped space station. The present invention provides a rapid completion of space station therefore, a great amount of time and expense can be saved. The space station is completed with a plurality of panels, wherein each panel is welded to provide a ring structure. The ring structure then is assembled and continued to create the torus-shaped or the cylindrical space station. As shown in FIGS. 1-5, the space station is completed with a plurality of station-constructing modules 1 arranged in a circular manner, and each of the plurality of station-constructing modules 1 comprises a panel dispensing unit 2, a panel transporting cart 13, a first welding assembly 15, a second welding assembly 16, a ring mobility unit 20, a battery 21, and a local computing device 22.

In reference to general configuration of the present invention, as shown in FIG. 7 and FIGS. 10-12, the panel dispensing unit 2 that stores and distributes the plurality of panels comprises a storage compartment 3, an access door 6, a hinged mechanism 7, and a pair of rails 8. The access door 6 is hingedly connected to the storage compartment 3 by the hinged mechanism 7 thus allowing access to the internal storage space of the storage compartment 3. The pair of rails 8 is outwardly connected to the storage compartment 3, opposite of the access door 6 and perpendicularly positioned to the access door 6. The first welding assembly 15 is connected along the pair of rails 8 and positioned parallel to the pair of rails 8. The second welding assembly 16 is terminally connected to the pair of rails 8 and positioned perpendicular to the pair of rails 8. The first welding assembly 15 and the second welding assembly 16 are utilized to seam weld vertical and horizontal lines between each of the plurality of panels. The panel transporting cart 13 is operatively coupled to the pair of rails 8, wherein the panel transporting cart 13 travels between the storage compartment 3 and the second welding assembly 16 so that each of the plurality of panels can be individually transported from the storage compartment 3 to the first welding assembly 15 and the second welding assembly 16. The ring mobility unit 20 is connected to the pair of rails 8 so that the plurality of station-constructing modules 1 can be outwardly moved. In other words, once an arbitrary ring of the space station is completed the plurality of panels, the panel dispensing unit 2, the panel transporting cart 13, the first welding assembly 15, and the second welding assembly 16 are outwardly moved by the ring mobility unit 20 so that a subsequent ring of the space station can be completed adjacent to the arbitrary ring. The hinged mechanism 7, the panel transporting cart 13, the first welding assembly 15, the second welding assembly 16, the ring mobility unit 20, and the local computing device 22 are electrically connected to the battery 21 so that the corresponding components can be electrically powered. The hinged mechanism 7, the panel transporting cart 13, the first welding assembly 15, the second welding assembly 16, and the ring mobility unit 20 are electronically connected to the local computing device 22 so that the automated assembly operations of the present invention can be executed.

Figure 2:
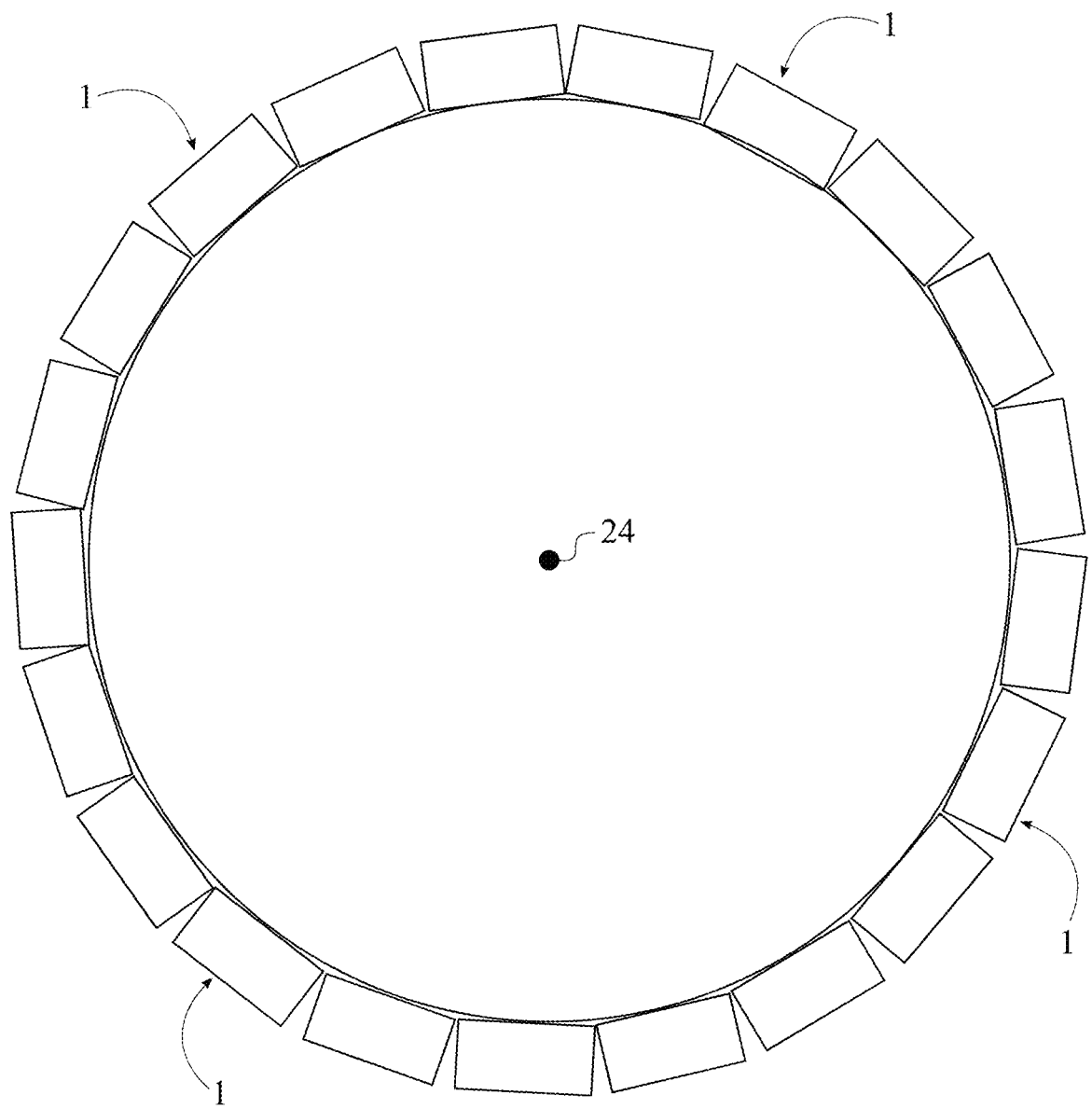
FIG. 2 is a front view showing the circular profile arrangement of the present invention.
Figure 3:
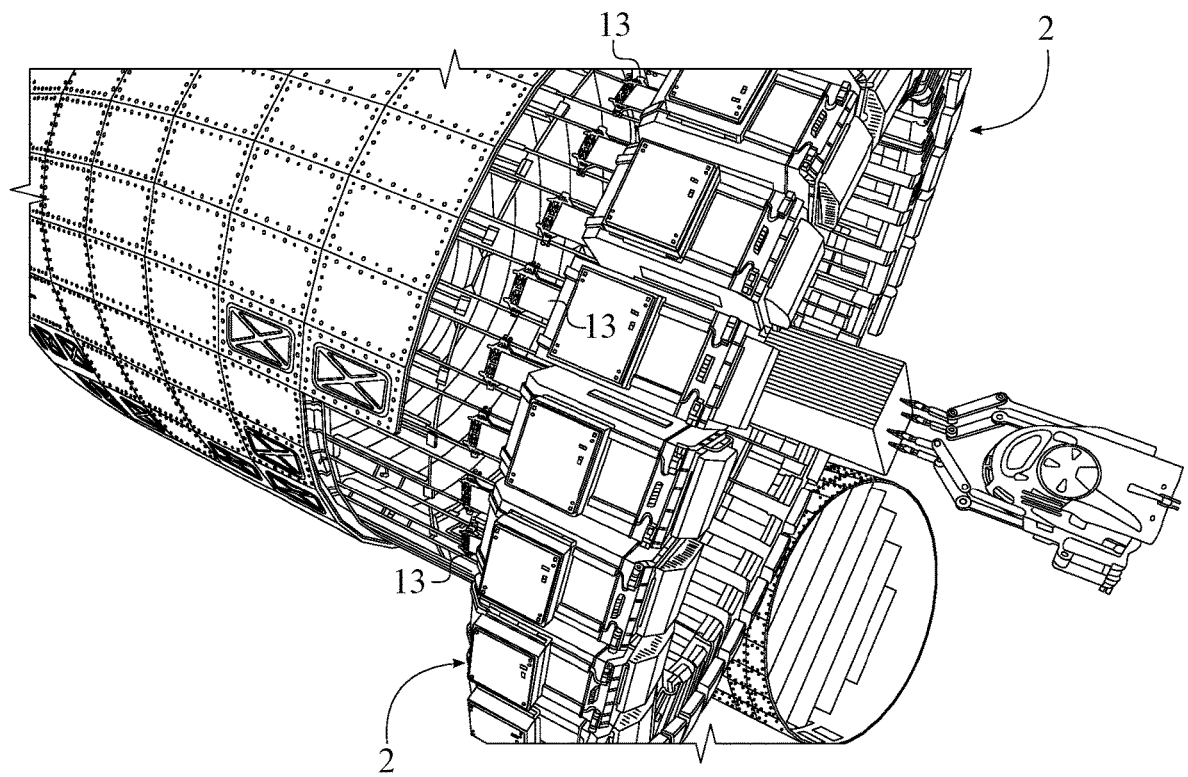
FIG. 3 is a perspective view of the present invention shown about the torus-shaped space station.

In order to execute the method for building the torus-shaped space station and/or cylindrical shaped space station, each of the plurality of station-constructing modules 1 is radially positioned around a central axis 24 so that the arbitrary ring of the space station can be sequentially build as shown in FIG. 2. More specifically, each of the plurality of station-constructing modules 1 is adjacently mounted to each other with the panel dispensing unit 2, the first welding assembly 15, and the second welding assembly 16 thus forming a circular profile. As a result, the circular profile of the plurality of station-constructing modules 1 is able to carry out the sequential assembly process of the torus-shaped space station and/or cylindrical shaped space station with the plurality of panels.

In reference to FIGS. 1-5, each of the plurality of panels is made of durable materials that are resistant to space radiation, internal pressure, micrometeoroids, and thermal effects of the sun and cold temperatures for very long periods of time. Preferably, each of the plurality of panels is made from stainless steel, titanium, and high-quality aluminum alloys with layers of insulation, although any desired materials may be used. Furthermore, the plurality of panels provides a flat rectangular structure as each panel is hull plates with Whipple shielding on top. Layers of polypropylene may be integrated with each panel also. Each of the plurality of panels has interior and exterior gripping or attachment points installed before launched into the storage compartment 3. In the preferred embodiment, each of the plurality of panels may have varying sizes depending on their position on the torus-shaped space station. Furthermore, the plurality of panels can comprise a window panel that has open and close features. The window panel is created to the same size and dimensions as the other panels of the plurality of panels to provide precise alignment throughout the space station.

Figure 7:
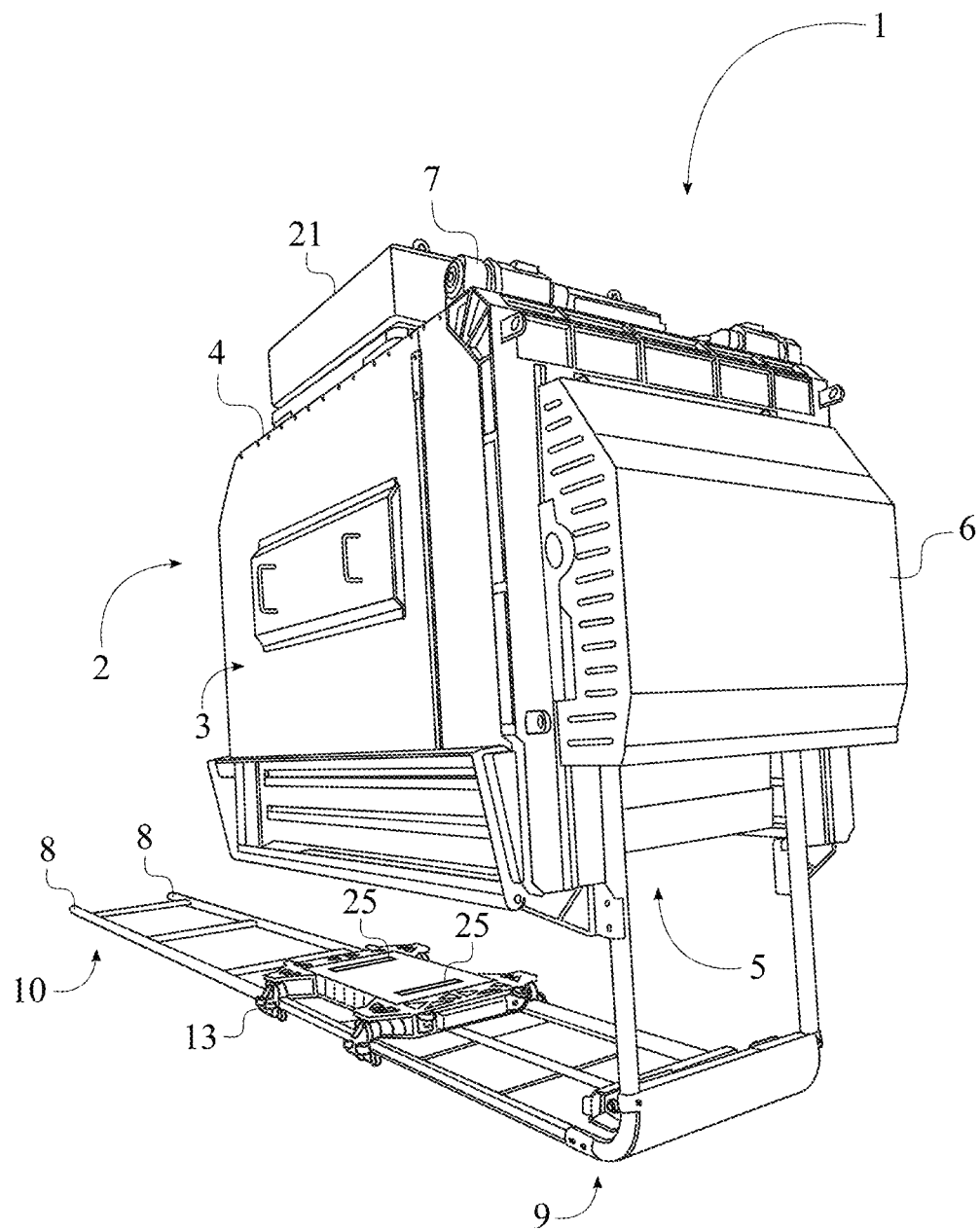
FIG. 7 is a perspective view of the panel dispensing unit of the present invention without the first welding assembly, the second welding assembly, and the ring mobility unit.
Figure 8:
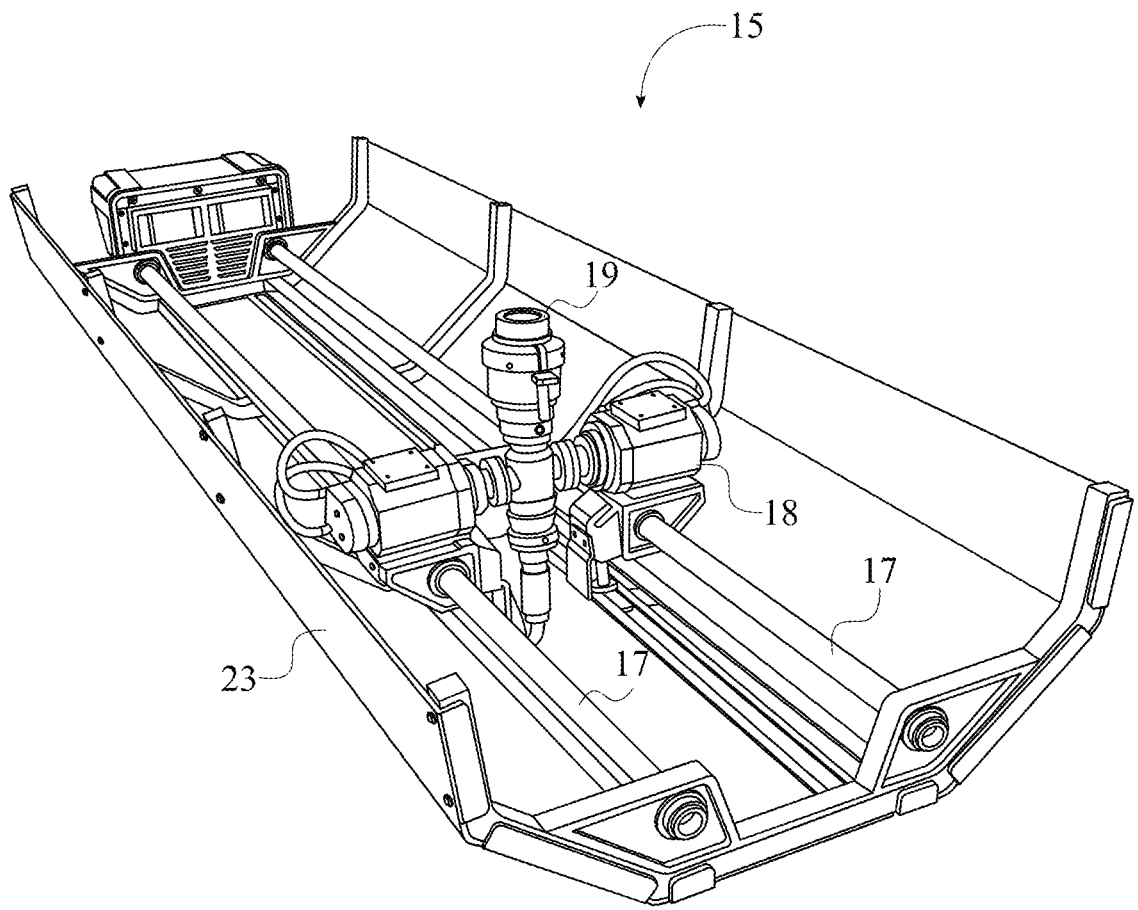
FIG. 8 is a perspective view showing the first welding assembly of the present invention.
Figure 9:
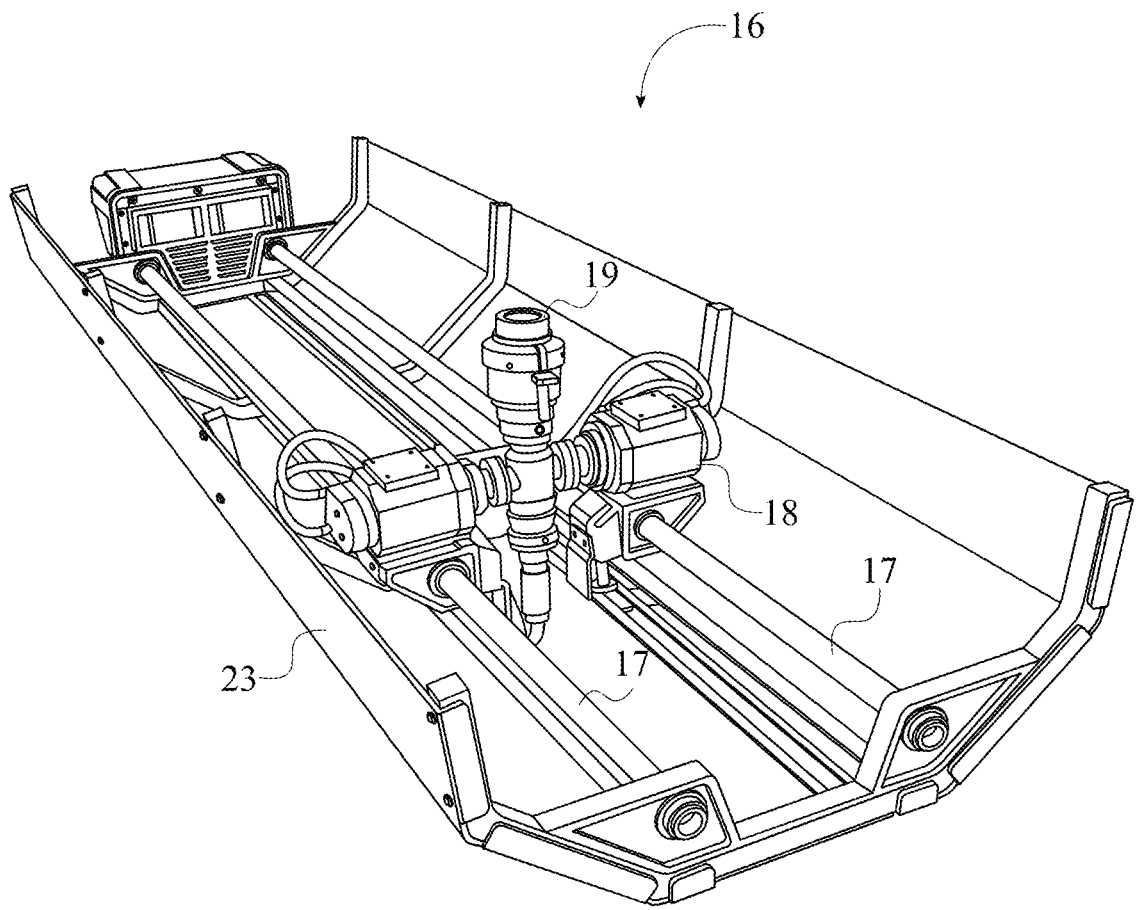
FIG. 9 is a perspective view showing the second welding assembly of the present invention.
Figure 11:
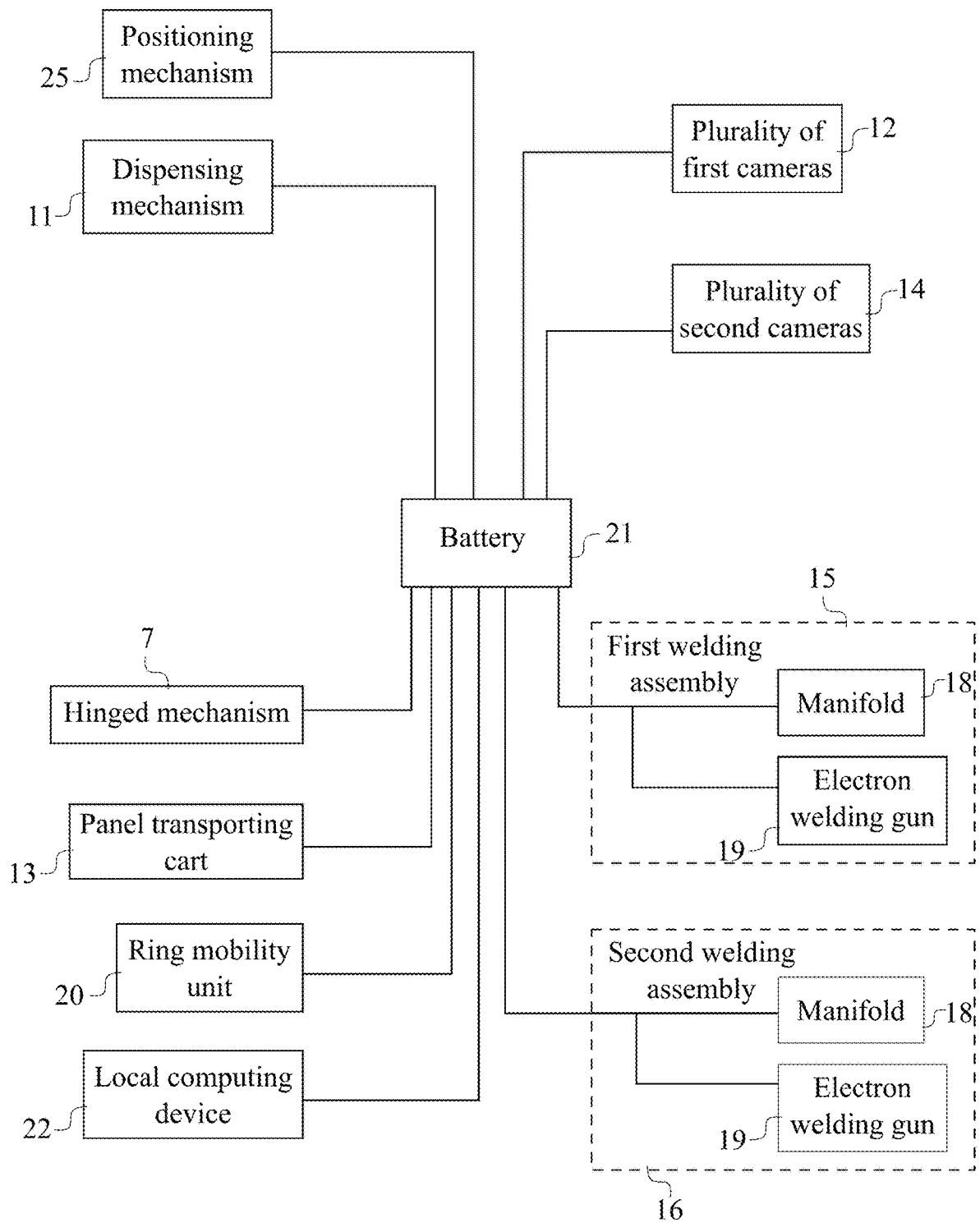
FIG. 11 is a schematic view showing the electrical connections of the present invention.
Figure 12:
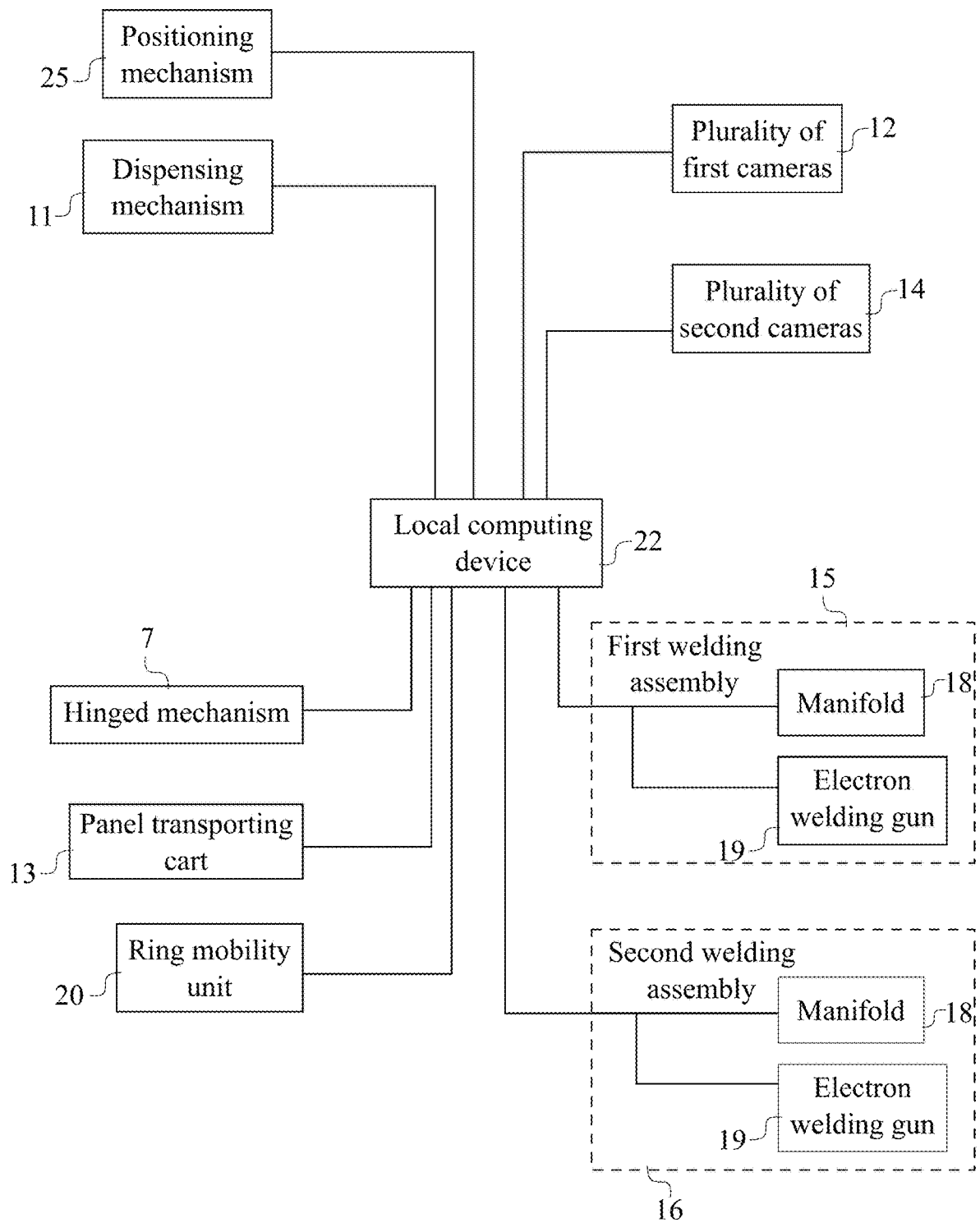
FIG. 12 is a schematic view showing the electronic connections of the present invention.

In reference to FIG. 7, FIG. 11, and FIG. 12, the storage compartment 3 provides a hollow box structure that is capable of storing and dispensing the plurality of panels. The plurality of panels is inserted into the storage compartment 3 through the access door 6 that operates using the hinge mechanism. When the access door 6 is at the opened configuration, the panels get restock within the storage compartment 3. More specifically, the hinged mechanism 7 is mounted to a top panel 4 of the storage compartment 3 thus allowing the access door 6 to be open in the upward direction. The plurality of panels is stacked vertically with multiple levels and extends in between a top panel 4 of the storage compartment 3 to a bottom opening 5 of the storage compartment 3. Each panel can be dispensed one at a time through the bottom opening 5 of the storage compart via a panel dispensing magazine 11 of the panel dispensing unit 2. More specifically, the panel dispensing magazine 11 is connected to the access door 6 and oriented towards internal storage area of the storage compartment 3. Furthermore, the panel dispensing magazine 11 is only operational when the access door 6 is at the closed configuration. The panel dispensing magazine 11 is electrically connected to the battery 21 and electronically connected to the local computing device 22 so that each of the plurality of panels can be individually dispensed onto the panel transporting cart 13. More specifically, a proximal end 9 of the pair of rails 8 is connected to the storage compartment 3 about the access door 6 as the pair of rails 8 is extended across the bottom opening 5. Due to the opening of the pair of rails 8, the panel transporting cart 13 is able to position underneath the bottom opening 5 thus allowing the panel dispensing magazine 11 to individually distribute each of the plurality of panels.

In reference to FIG. 7, the battery 21 is externally mounted onto the top panel 4 of the storage compartment 3, and the local computing device 22 is externally mounted onto the top panel 4 storage compartment 3. When the battery 21 is low, it can be easily replaced with a fully charged battery 21 due to the external positioning of the storage compartment 3. In the preferred embodiment, all of components that are powered through the battery 21 power are hardwired electrical connection to prevent potential maintenance problems. The local computing device 22 is also preferably hardwired onto all of the components that required electronical connections.

In reference to FIG. 4, FIG. 5, FIG. 7, FIG. 11, and FIG. 12, the panel transporting cart 13 is a mobile vehicle that can transport each of the plurality of panels from the panel dispensing magazine 11 to a specific location of the arbitrary ring that is determined by the local computing device 22. More specifically, the panel transporting cart 13 is slidably mounted in between a distal end 10 of the pair of rails 8 and the proximal end 9 of the pair of rails 8 as the proximal end 9 is adjacently positioned to the storage compartment 3, and the distal end 10 is offset from the storage compartment 3. When each panel is loaded onto the panel transporting cart 13, the corresponding panel is mechanically or magnetically secured to the panel transporting cart 13 to prevent any lateral movements. Since the panel transporting cart 13 moves along the pair of rails 8, the transported panel can be securely transported onto the specific location of the arbitrary ring so that the first welding assembly 15 and the second welding assembly 16 can initiate the welding process. The panel transporting cart 13 is electrically connected to the battery 21 so that the panel transporting cart 13 can be operational along the pair of rails 8. Operation of the panel transporting cart 13 is executed by the local computing device 22 due to the electronical connection. Furthermore, the panel transporting cart 13 integrated with a positioning mechanism 25 that electrically is electrically connected to the battery 21 and electronically connected to the local computing device 22. The positioning mechanism 25 allows the transported panel to be tilted, moves, and rotate so that the transported panel is able to precisely meet with adjacent panels of the ring structure. As a result, the positioning mechanism 25 can correct slight misalignment of the transported panel thus ensuring that the first welding assembly 15 and the second welding assembly 16 create airtight seam welding connections.

Figure 5:
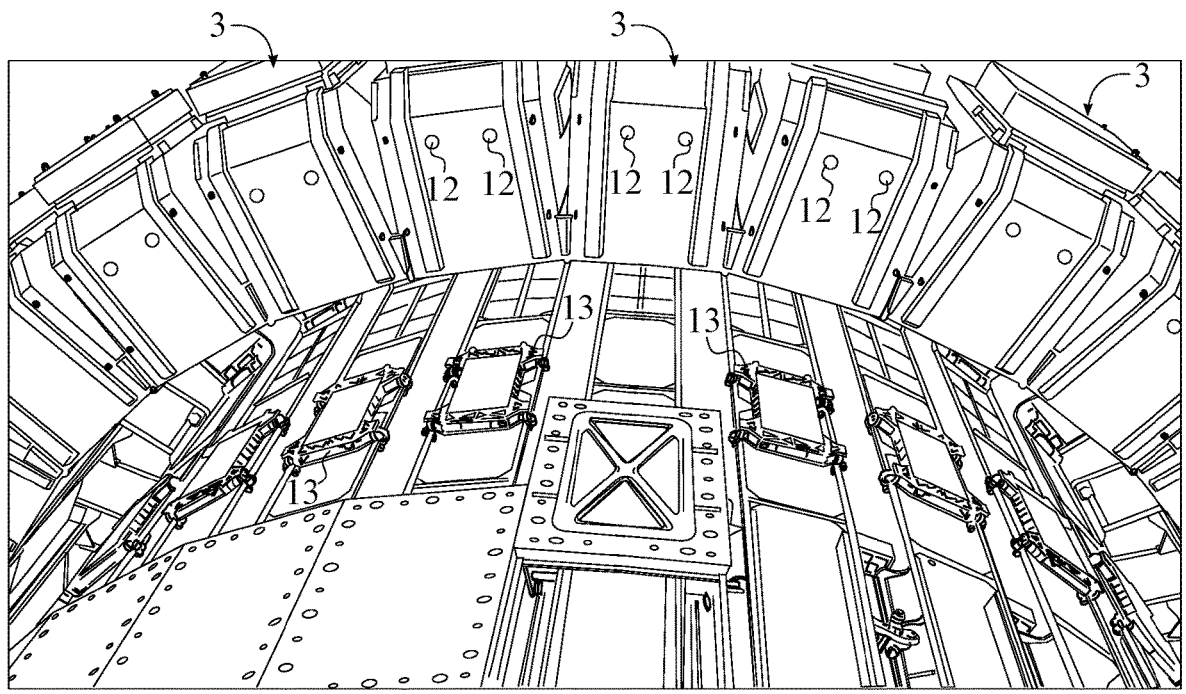
FIG. 5 is a front perspective view of the present invention.

In reference to FIG. 5, FIG. 11, and FIG. 12, the panel dispensing unit 2 may further comprise a plurality of compartment cameras 12 to observe the surrounding area of the storage compartment 3. More specifically, the plurality of compartment cameras 12 is externally mounted to the storage compartment 3 and oriented towards the pair of rails 8. The plurality of compartment cameras 12 are electrically connected to the battery 21 and electronically connected to the local computing device 22 so that the local computing device 22 is able to use visual data of the plurality of compartment cameras 12 to implement any adjustment within the present invention.

Figure 4:
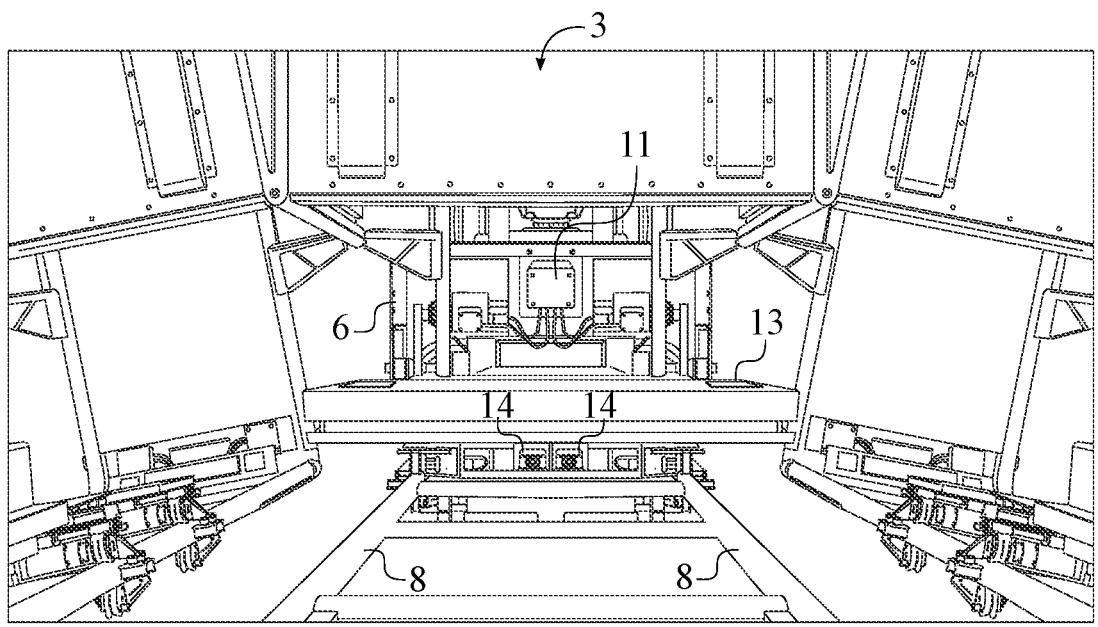
FIG. 4 is a front view of the present invention showing the panel transporting cart and the panel dispensing magazine.

In reference to FIG. 4, FIG. 11, and FIG. 12, each of the plurality of station-constructing modules 1 may further comprise a plurality of cart cameras 14 to observe the area between the panel transporting cart 13 and the second welding assembly 16. More specifically, the plurality of cart cameras 14 is externally mounted to the panel transporting cart 13 and oriented towards the first welding assembly 15 and the second welding assembly 16. The plurality of cart cameras 14 are electrically connected to the battery 21 and electronically connected to the local computing device 22 so that the local computing device 22 is able to use visual data of the plurality of cart cameras 14 to implement any adjustment within the present invention.

Furthermore, the plurality of compartment cameras 12 and the plurality of cart cameras 14 of adjacent assemblies from the plurality of station-constructing modules 1 are able to examine the panel meeting area of the transported panel and communicate with the local computing device 22. As a result, an arbitrary assembly from the plurality of station-constructing modules 1 is able to accurately operate the positioning mechanism to properly position the transported panel within the ring structure.

Figure 6:
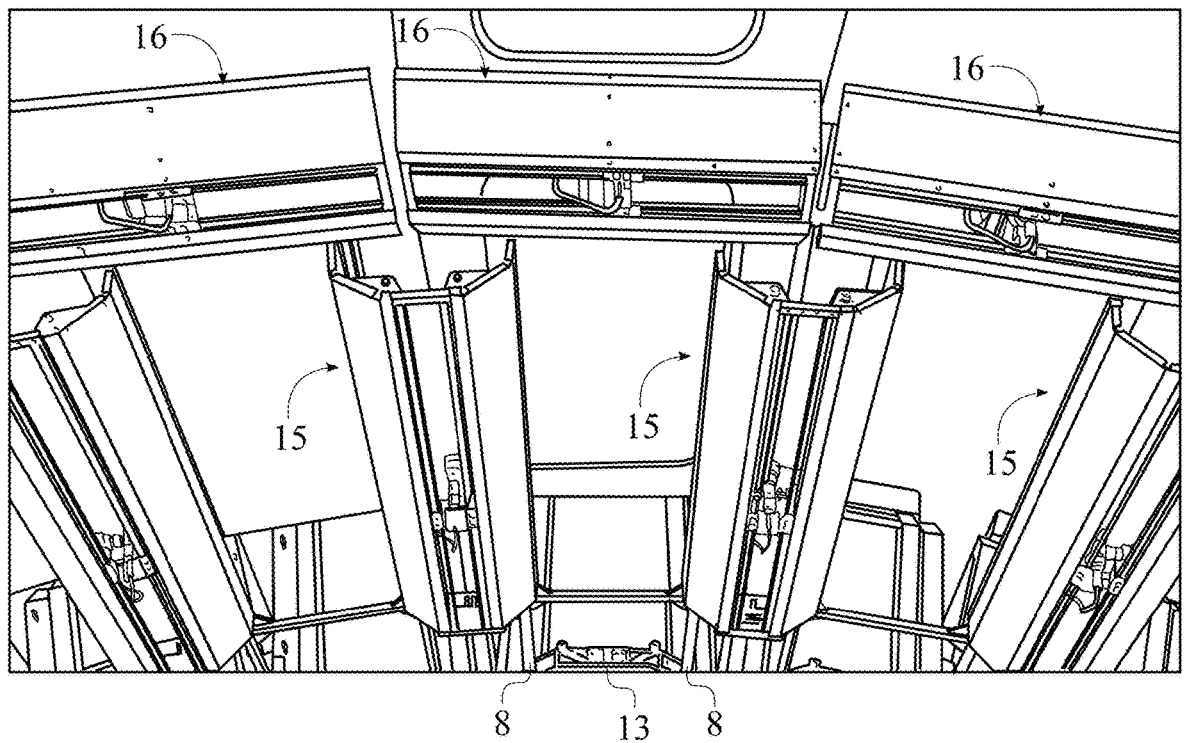
FIG. 6 is a perspective view showing the arrangement of the first welding assembly and the second welding assembly.
Figure 10:
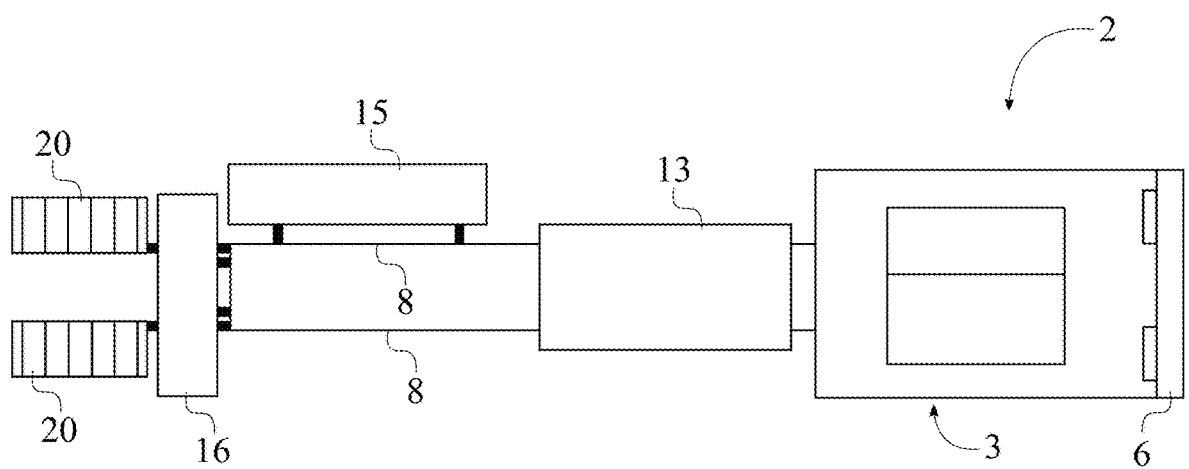
FIG. 10 is a schematic top view of the present invention showing the ring mobility unit.

In reference to FIG. 6 and FIG. 10, the first welding assembly 15 is externally connected along one of the rail of the pair of rails 8 and extended from the distal end 10 of the pair of rails 8 towards the storage compartment 3. The first welding assembly 15 is utilized within the present invention to complete a lengthwise seam weld (horizontal seam weld) between a pair of panels from the plurality of panels. More specifically, the first welding assembly 15 moves between the distal end 10 of the pair of rails 8 and the storage compartment 3 so that the lengthwise seam weld can connect the pair of panels to each other.

In reference to FIG. 6 and FIG. 10, the second welding assembly 16 is externally positioned across the pair of rails 8 and terminally connected to the distal end 10 of the pair of rails 8. The second welding assembly 16 is utilized within the present invention to complete a crosswise seam weld (vertical seam weld) between a pair of panels from the plurality of panels. More specifically, the second welding assembly 16 moves along the distal end 10 of the pair of rails 8 so that the crosswise seam weld can connect the pair of panels to each other.

In reference to FIG. 8, FIG. 9, FIG. 11, and FIG. 12, the first welding assembly 15 and the second welding assembly 16 may each comprise a housing 23, a guide rail 17, a manifold 18, and an electron welding gun 19 to connect the plurality of panels to each other. More specifically, the housing 23 functions as the stationary components that mounts the first welding assembly 15 and the second welding assembly 16 to the pair of rails 8. The guide rail 17 is connected within the housing 23 and extended along the housing 23 so that the manifold 18 can slidably mount to the guide rail 17. In other words, the guide rail 17 function as a track thus allowing the manifold 18 to move back and forth along the guide rail 17. The electron welding gun 19 is mounted to the manifold 18 so that the seam weld can be completed within the present invention. In order to create the most efficient and hermetic seam welds, the exact positioning of the electron welding gun 19 can be adjusted within the present invention as the manifold 18 is able to move, adjust, and rotate along a Y-axis and an X-axis of the manifold 18. The manifold 18 and the electron welding gun 19 are electrically connected to the battery 21 thus electrically powering each of the components. The manifold 18 and the electron welding gun 19 are electronically connected to the local computing device 22 so that the local computing device 22 is able to initiate and finish the lengthwise seam weld and the crosswise seam weld. Furthermore, the first welding assembly 15 and the second welding assembly 16 can each comprise a plurality of third cameras that is electrically connected to the battery 21 and electronically connected to the local computing device 22. The plurality of third cameras is mounted to the manifold 18 and visually inspects the surrounding areas of the electron welding gun 19 to initiate movements of the manifold 18.

In reference to FIG. 10, the ring mobility unit 20 is terminally connected the pair of rails 8 so that the panel dispensing unit 2, the panel transporting cart 13, the first welding assembly 15, the second welding assembly 16, the battery 21, and the local computing device 22 can be simultaneously moves from the completed arbitrary ring to initiate the building process of the subsequent ring.

Furthermore, the local computing device 22 is communicably coupled with a remote computing device so that the remote computing device is able to wirelessly communicate with the local computing device 22. The remote computing device can be stationed within a separate spacecraft or a commanding center.

Utilizing the present invention, the torus-shaped space station and/or cylindrical shaped space station can be built extremely fast as shown in FIG. 1. The body of a spacecraft, a space station module, and a station elevator tube would need the plurality of panels to be same size and shape. Due to the implementation of the present invention, an immense amount of time and expense can be saved thus significantly accelerating the space station building process. As can be seen in FIGS. 1 and 2, using the disclosed components of the present invention, Voluminous Environment Rotating Architecture (VERA) stations can be built. In reference to a preferred embodiment of the space station, the elevators for the VERA station would be about 8 meter in diameter to allow for a large population to evacuate the main ring quickly. The Station Transfer Vehicles would be about 14 meter in diameter.

Although the invention has been explained in relation to its preferred embodiment, it is to be understood that many other possible modifications and variations can be made without departing from the spirit and scope of the invention as hereinafter claimed.

What is claimed is:

1. A rapid sequential circular assembly system for a space station comprising:
    a plurality of station-constructing modules arranged in a circular manner;
    each of the plurality of station-constructing modules comprising a panel dispensing unit, a panel transporting cart, a first welding assembly, a second welding assembly, a ring mobility unit, a battery, and a local computing device;
    the panel dispensing unit comprising a storage compartment, an access door, a hinged mechanism, and a pair of rails;
    the access door being hingedly connected to the storage compartment by the hinged mechanism;
    the pair of rails being outwardly connected to the storage compartment, opposite of the access door;
    the pair of rails being perpendicularly positioned to the access door;
    the first welding assembly being connected along the pair of rails;
    the first welding assembly being positioned parallel to the pair of rails;
    the second welding assembly being terminally connected to the pair of rails;
    the second welding assembly being positioned perpendicular to the pair of rails;
    the panel transporting cart being operatively coupled to the pair of rails, wherein the panel transporting cart travels between the storage compartment and the second welding assembly;

the ring mobility unit being connected to the pair of rails;

the hinged mechanism, the panel transporting cart, the first welding assembly, the second welding assembly, the ring mobility unit, and the local computing device being electrically connected to the battery; and the hinged mechanism, the panel transporting cart, the first welding assembly, the second welding assembly, and the ring mobility unit being electronically connected to the local computing device.

2. The system as claimed in claim 1 comprising:

the panel dispensing unit further comprising a panel dispensing magazine;

the panel dispensing magazine being connected to the access door;

the panel dispensing magazine being oriented towards the storage compartment;

the dispensing panel dispensing magazine being electrically connected to the battery; and the dispensing panel dispensing magazine being electronically connected to the local computing device.

3. The system as claimed in claim 1 comprising:

the panel dispensing unit further comprising a plurality of compartment cameras;

the plurality of compartment cameras being externally mounted to the storage compartment;

the plurality of compartment cameras being oriented towards the pair of rails;

the plurality of compartment cameras being electrically connected to the battery; and the plurality of compartment cameras being electronically connected to the local computing device.

4. The system as claimed in claim 1 comprising:

the storage compartment comprising a top panel and a bottom opening;

the hinged mechanism being mounted to the top panel;

a proximal end of the pair of rails being connected to the storage compartment about the access door;

the pair of rails being extended across the bottom opening;

the battery being connected onto the top panel; and the local computing device being connected onto the top panel.

5. The system as claimed in claim 1 comprising: each of the plurality of station-constructing modules further comprising a plurality of cart cameras; the plurality of cart cameras being mounted to the panel transporting cart; the plurality of cart cameras being oriented towards the first welding assembly and the second welding assembly; the plurality of cart cameras being electrically connected to the battery; and the plurality of cart cameras being electronically connected to the local computing device.

6. The system as claimed in claim 1 comprising:

the first welding assembly being externally connected along a rail from the pair of rails; and the first welding assembly being extended from a distal end of the pair of rails towards the storage compartment.

7. The system as claimed in claim 1 comprising:

the second welding assembly being externally positioned across the pair of rails; and the second welding assembly being terminally connected to a distal end of the pair of rails.

8. The system as claimed in claim 1 comprising:

the first welding assembly and the second welding assembly each comprising a housing, a guide rail, a manifold, and an electron welding gun;

the housing being connected to the pair of rails;

the guide rail being connected within the housing;

the guide rail being extended along the housing;

the manifold being slidably mounted to the guide rail;

the electron welding gun being mounted to the manifold;

the manifold and the electron welding gun being electrically connected to the battery; and the manifold and the electron welding gun being electronically connected to the local computing device.

9. The system as claimed in claim 1 comprising:

the panel transporting cart being slidably mounted in between a distal end of the pair of rails and a proximal end of the pair of rails;

the proximal end being adjacently positioned to the storage compartment; and the distal end being offset from the storage compartment.

10. The system as claimed in claim 1 comprising:

the battery being externally mounted to the storage compartment; and the local computing device being externally mounted to the storage compartment.

11. The system as claimed in claim 1 comprising:

each of the plurality of station-constructing modules being radially positioned around a central axis; and each of the plurality of station-constructing modules being adjacently mounted to each other with the panel dispensing unit, the first welding assembly, and the second welding assembly.

12. The system as claimed in claim 1, wherein the ring mobility unit simultaneously moves the panel dispensing unit, the panel transporting cart, the first welding assembly, the second welding assembly, the battery, and the local computing device.

* * * * *